TRANSISTOR RING COUNTING CIRCUIT

Original Filed Jan. 6, 1958 5 Sheets-Sheet 1

*INVENTOR.*
ALFRED H. FAULKNER
*BY* C. A. Gulbrandsen
ATTY.

INVENTOR.
ALFRED H. FAULKNER
BY
C. A. Gulbransen
ATTY.

April 23, 1963 A. H. FAULKNER 3,087,075

TRANSISTOR RING COUNTING CIRCUIT

Original Filed Jan. 6, 1958 5 Sheets-Sheet 3

INVENTOR.
ALFRED H. FAULKNER
BY C. A. Gulbrandsen
ATTY.

INVENTOR.
ALFRED H. FAULKNER

BY C. A. Gullbrandsen

ATTY.

April 23, 1963 A. H. FAULKNER 3,087,075

TRANSISTOR RING COUNTING CIRCUIT

Original Filed Jan. 6, 1958 5 Sheets-Sheet 5

INVENTOR.
ALFRED H. FAULKNER

BY
C. A. Gulbrandsen
ATTY.

3,087,075

TRANSISTOR RING COUNTING CIRCUIT

Alfred H. Faulkner, Redondo Beach, Calif., assignor to Automatic Electric Laboratories, Inc., a corporation of Delaware Original application Jan. 6, 1958, Ser. No. 707,298, now Patent No. 3,041,400, dated June 26, 1962. Divided and this application Feb. 20, 1959, Ser. No. 794,610
8 Claims. (Cl. 307—88.5)

This invention relates to a transistor pulse distributor, and more particularly to a pulse distributor for an electronic time-division multiplex telephone system. The present application is a division of my co-pending application Serial No. 707,298, filed January 6, 1958, now Patent No. 3,041,400, issued June 26, 1962, for an Electronic Switching System.

The principal object of the invention is to provide a pulse distributor employing a fast and positively acting transistor ring counter.

According to the invention, in a pulse distributor, a counting ring is provided comprising a plurality of normally conducting transistor switching-circuit stages individually connected to output circuits over which pulses are transmitted in succession in the respective time slots of the multiplex system. The stages are supplied with successive pulses over a common input from a pulse generator referred to as a clock. The stage from which an output pulse is being transmitted is biased to cutoff and thereby rendered non-conductive during the period of transmission. The counting ring employs a single transistor per stage, of a type having a current amplification factor, alpha, less than unity. For high speed operation, surface barrier transistors are preferred.

The arrangement for advancing the counting ring includes a condenser per stage, which charges when its stage is non-conductive, and discharges during the input pulse to cutoff the succeeding stage. Each stage is provided with a transistor amplifier in its output circuit.

Another feature in the pulse distributor relates to an arrangement in which output pulses from two counting rings are combined through gate circuits to supply output pulses in succession to leads, the number of which is the product of the number of stages in the two counting rings.

The above-mentioned and other objects and features of this invention and the manner of attaining them will become more apparent, and the invention itself will be best understood, by reference to the following description of an electronic switching system embodying the invention, taken in conjunction with the accompanying drawings comprising FIGS. 1 to 6 wherein.

Figures 3, 6:
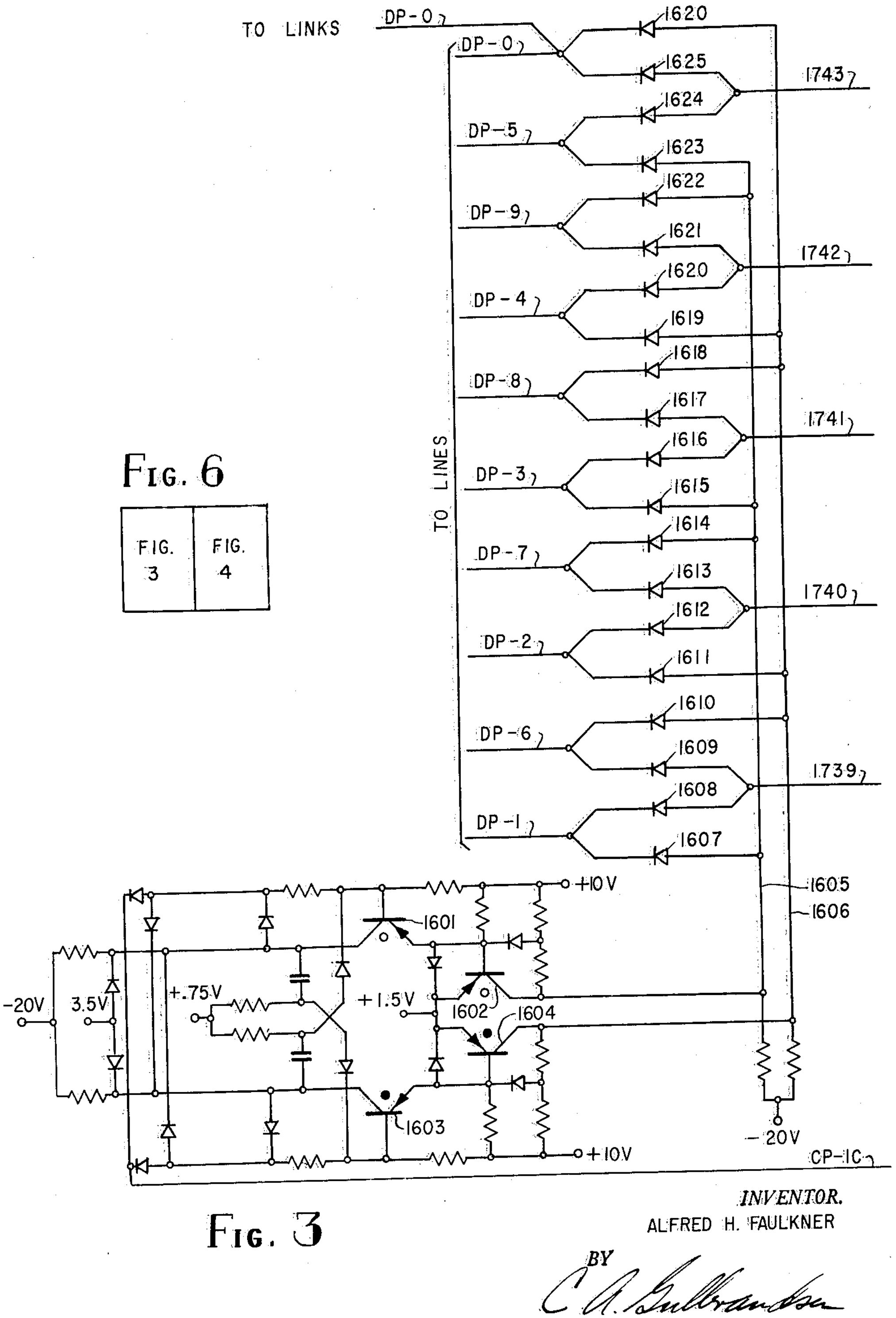
Figure 4:
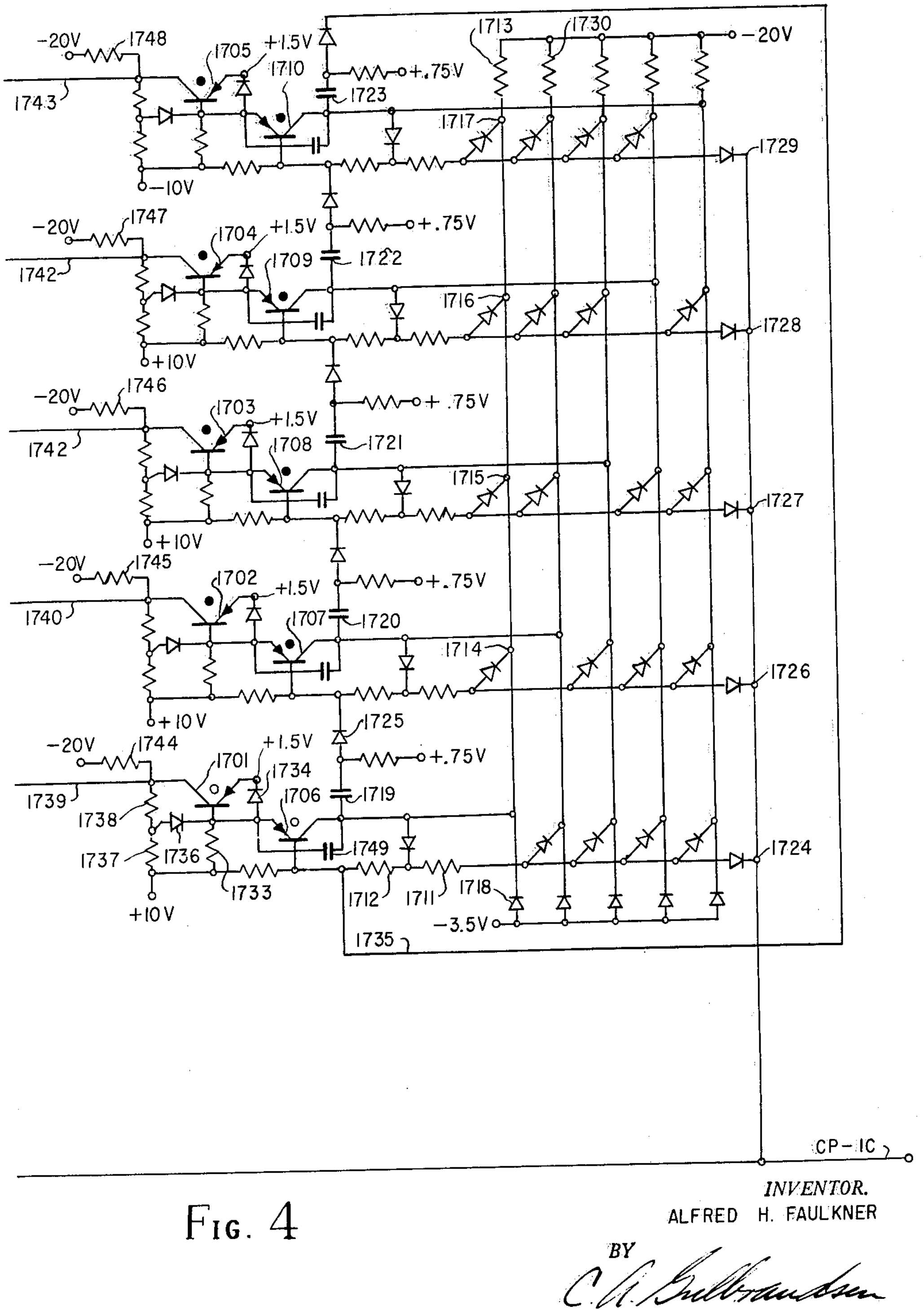
Figure 5:
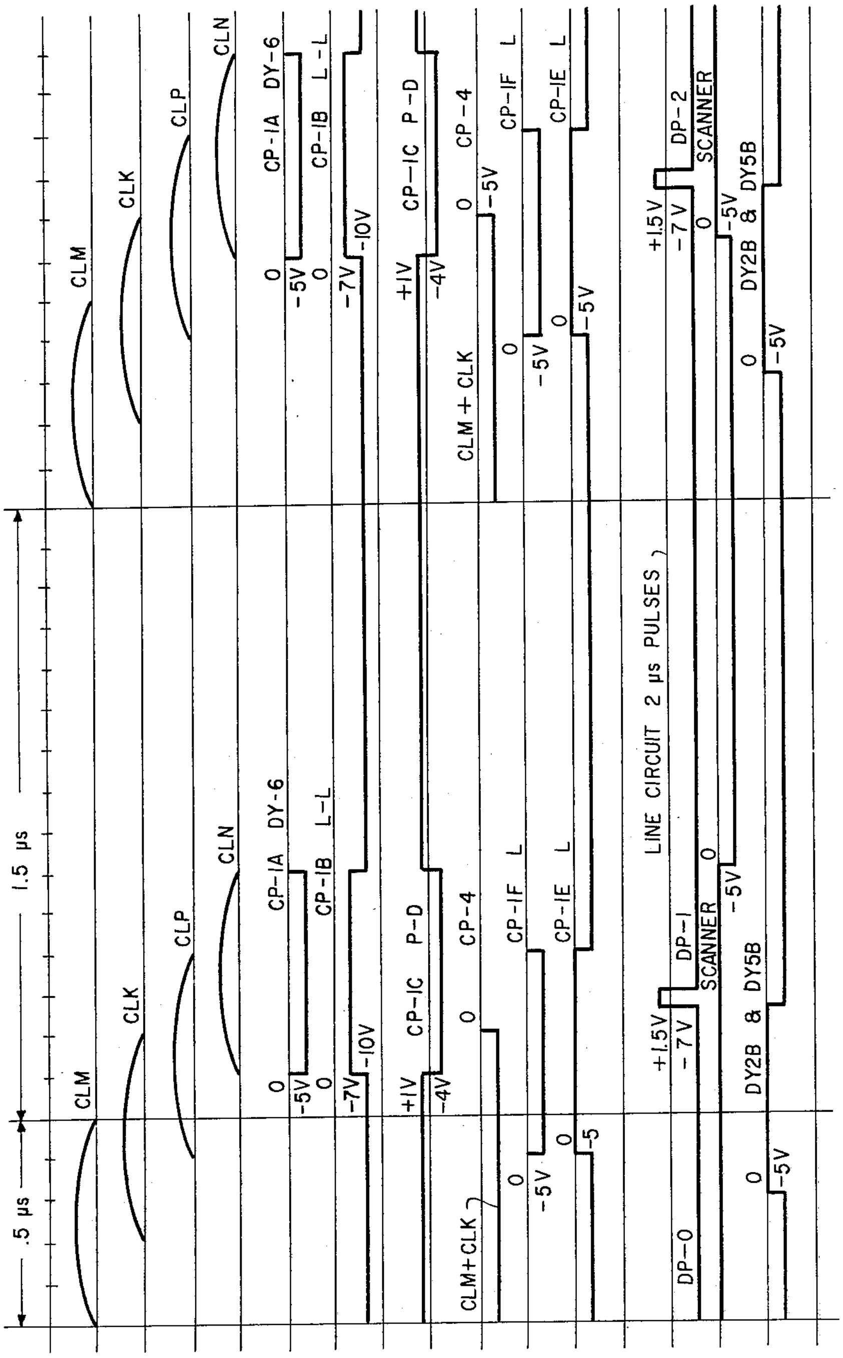

FIGS. 3 and 4 comprise a schematic diagram of the pulse distributor;

FIG. 5 comprises graphs illustrating the approximate shape and time relationship of the various pulses of the system; and FIG. 6 shows the manner of arrangement of FIGS. 3 and 4.

The pulse distributor of the invention is used in the telephone system which is disclosed in said original application Serial No. 707,298 and also in Patent No. 2,938,961, which is another division of the original application. The clock and distributor described herein form the source of pulses for that system.

*Clock*

The function of the clock circuit 105 is to produce synchronously related gating and supervisory pulses to the system. The pulses vary from 0.5 microsecond in length to 0.7 microsecond in length. FIG. 5 illustrates the position and form of the pulses produced and should be referred to while reading the following detailed description of the clock circuit.

Figure 2:
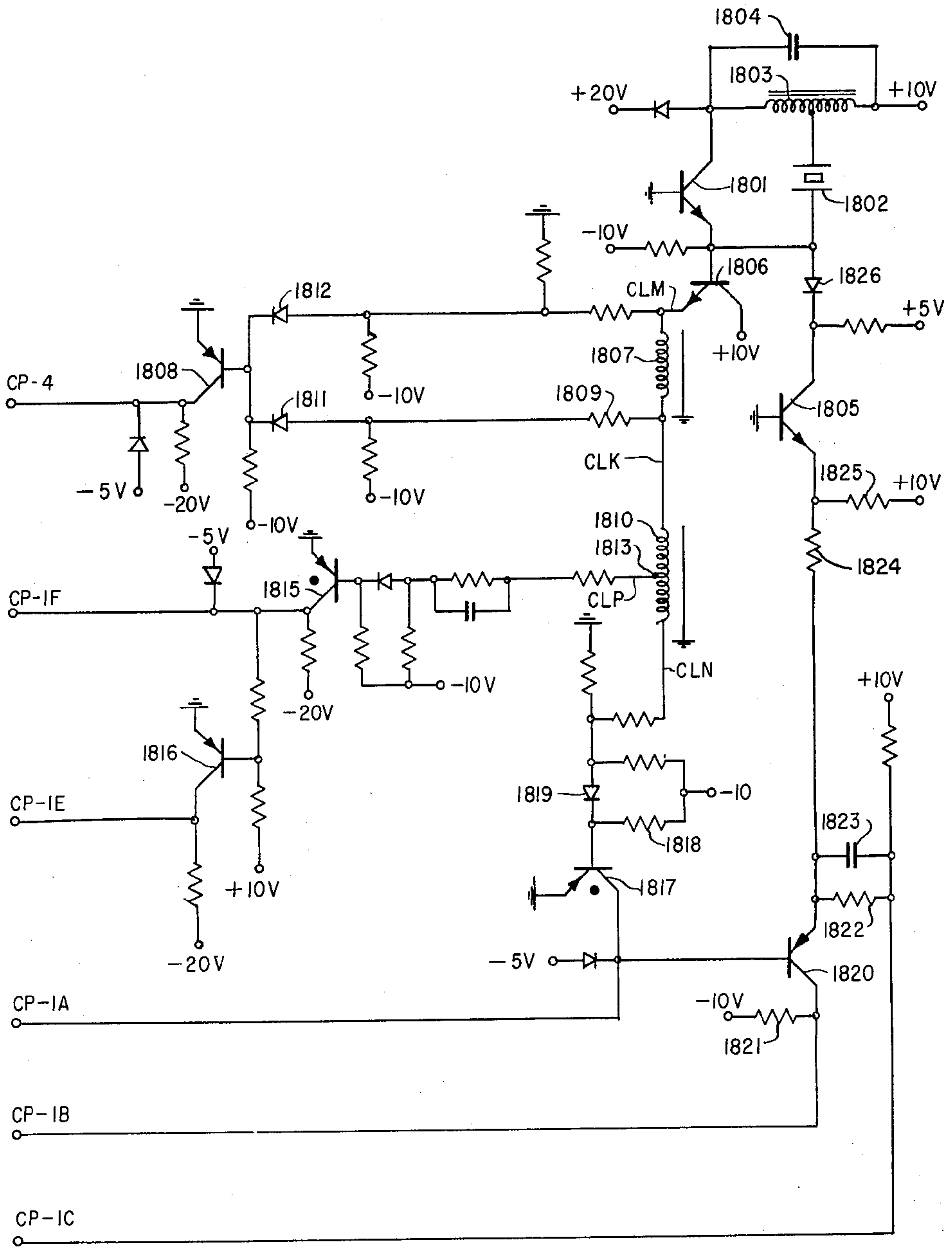
FIG. 2 is a schematic diagram of the clock.

Referring to FIG. 2, an oscillator circuit is associated with transistor 1801 and a 1,000 kilocycle crystal 1802. The voltage waveform appearing across the tuned circuit comprising inductance 1803 and capacitor 1804 is sinusoidal but the transistor 1801 feeds energy to the tuned circuit only during the negative half cycles since the emitter base circuit is cut off during the positive half cycles.

Since the impedance of the emitter circuit is very low in the forward direction and high in the reverse direction, the voltage waveform at the emitter resembles a half wave rectified sine wave; the negative half cycles being suppressed by the low forward drop in the emitter circuit. This voltage waveform at the emitter of transistor 1801 is further modified by transistor 1805 which suppresses the voltage waveform at the emitter of transistor 1801 every other positive half cycle as will be hereinafter explained. Therefore, the voltage at the emitter of transistor 1801 and consequently the base of transistor 1806 consists of a positive half cycle having a duration of 0.5 microsecond, followed by substantially zero voltage for three half cycles or 1.5 microseconds. The amplitude of the positive peak is approximately 8 volts.

Transistor 1806 is operated as an emitter follower amplifier and the output pulse on lead CLM from transistor 1806 is fed into a 0.2 microsecond delay line 1807 and also into one of the clock pulse circuits associated with transistor 1808. The shape and duration of the pulse on lead CLM is illustrated in FIG. 5.

An output pulse on lead CLK from the 0.2 microsecond delay line 1807 lags the pulse on lead CLM by 0.2 microsecond which is illustrated in FIG. 5 also. The pulse on lead CLK is tapped off through resistor 1809 into the clock pulse circuit associated with transistor 1808 and also is fed into the center tapped 0.4 microsecond delay line 1810.

Both a pulse on lead CLM and lead CLK are fed into the base of transistor 1808 through diodes 1812 and 1811 respectively, which isolate leads CLM and CLK. It will be recalled from the preceding description that the pulses on lead CLM and on lead CLK are 0.5 microsecond long and spaced 0.2 microsecond apart. Thus the pulse on lead CLK commences before the pulse on lead CLM expires thus continuing the cutoff of the normally saturated transistor 1808 until the pulse on lead CLK expires. This results in an approximately 0.7 microsecond long negative pulse on lead CP–4. The form and relative time position of the pulse on lead CP–4 is illustrated in FIG. 5.

As has been stated, the pulse on lead CLK is also fed into the 0.4 microsecond center tapped delay line 1810 and after a 0.2 microsecond delay a pulse appears at the center tap point 1813 of delay line 1810 and that pulse will now be called the pulse on lead CLP and is illustrated in FIG. 5 also.

The pulse on lead CLP is fed to the base of transistor 1815 and there cuts off normally saturated transistor 1815 to produce the negative clock pulse on lead CP–1F at the collector of transistor 1815. The pulse on lead CP–1F is illustrated in FIG. 5.

The pulse on lead CP–1F is also fed into transistor 1816 where it causes normally cut-off transistor 1816 to saturate during the pulse duration thereby producing the pulse on lead CP–1E which is also illustrated in FIG. 5.

As will be recalled, the pulse on CLP was obtained from the center tap of delay line 1810. Now, however, the concern is with the output pulse from delay line 1810 which will be called the pulse at point CLN and this pulse is illustrated in FIG. 5 also.

This pulse cuts off normally saturated transistor 1817, causing its collector to swing from near ground to approximately −5 volts to produce the pulse on lead CP–1A which is illustrated in FIG. 5. In between the pulses at point CLN, transistor 1817 is biased into the saturation region by current flowing from −10 volts through resistor 1818 into its base. Diode 1819 is normally biased in the reverse direction to insure that all of this current flows into the base. A small change in voltage at the base is required to turn transistor 1817 off therefore the output pulse on lead CP–1A is essentially rectangular, having rise and decay times of about 0.1 microsecond.

The pulse on lead CP–1A is also applied to the base of transistor 1820 which functions as a split load phase inverter and amplifier. The inverted pulse obtained from the collector of transmitter 1820 is placed on lead CP–1B and is illustrated in FIG. 5. This pulse on lead CP–1B is transformer coupled at the other end of lead CP–1B and the inversion is not actually necessary but the pulse was derived from the collector circuit simply to permit convenient adjustment of its amplitude by suitable choice of resistor 1821 without affecting other pulses.

A pulse swinging from 0 to −5 volts is obtained at the emitter of transistor 1820. This pulse is dropped to +1 volt to −4 volts by the parallel resistor 1822 and capacitor 1823 and is now known as the pulse on lead CP–1C.

The emitter of transistor 1820 is also connected through resistor 1824 to the emitter of transistor 1805 which is normally reverse biased by resistor 1825 connected to +10 volts. During the time the pulse is on lead CP–1C transistor 1805 is driven into saturation and remains in this region for an additional 0.5 microsecond following the pulse due to hole storage. The base of transistor 1806 and the emitter of transistor 1801 is clamped to ground through diode 1826 and the collector of transistor 1805 during this period.

The effect of hole storage is to lengthen the period that the clamp is effective to insure that it completely overlaps the positive half-cycle of the oscillator wave that is suppressed.

It can be seen that the first positive pulse presented to transistor 1806 causes a clamp effect to occur on the base of transistor 1806 from 0.8 to 1.0 microsecond later than the beginning of the first positive pulse and to last approximately 1 microsecond. This is because the first positive pulse is delayed 0.6 microsecond in the delay lines 1807 and 1810 and from 0.2 to 0.4 microsecond in transistors 1817, 1820, and 1825 before the base of transistor 1806 is clamped to ground. The clamp lasts approximately 1 microsecond, 0.5 microsecond due to saturation from the pulse from the emitter of transistor 1820 and 0.5 microsecond due to the hole storage in transistor 1805. Therefore the output from transistor 1801 to the base of transistor 1806 will be a positive half-cycle of 0.5 microsecond duration followed by a pause of 1.5 microseconds.

*Pulse Distributor*

The pulse distributor 104 produces pulses of approximately 2.0 microseconds in duration and −7 volts in amplitude. By referring to FIG. 5 there can be seen the time relation of the 2.0 microsecond pulse with the other pulses of the system. The pulse distributor 104 is shown in detail in FIGS. 3 and 4, arranged as shown in FIG. 6.

These pulses appear on leads DP–1 to DP–0 of FIG. 3 one at a time, thus allotting each line of the system its particular time space.

The distributor is composed of three circuits; a ring-of-five counter circuit which produces five sequential pulses 2.0 microseconds in duration; a ring-of-two counter circuit which is identical to the ring-of-five counter circuit except that there are only two steps; and a diode matrix circuit which combines the pulses from the two counter circuits to produce a −7 volt pulse at its output lead DP–1 to DP–0. A detailed explanation of the three mentioned circuits of the pulse distributor follows.

Referring to FIG. 4 there can be seen the pulse distributor ring-of-five counter circuit. This circuit has two transistors per stage typified by transistors 1701 and 1706. Transistors 1706 to 1710 are of the surface barrier type and are necessary to obtain reliable operation at the high speed at which this counter circuit operates. Since the current gain and power dissipation of these transistors is limited, it is necessary to use transistors to feed the external load circuit. These slave transistors 1701 to 1705 have a considerably lower alpha cutoff frequency than the surface barrier type, but can dissipate much more power and provide high current gain. Being slaves, their slower response does not limit the counting rate in any way.

This counting chain is unique in that all stages except one are normally conducting, whereas in conventional counting chains only one stage is normally conducting, that is to say, in counting circuits using one transistor per stage, which is the class in which this one belongs since the second transistor plays no role in the counting operation.

Figure 1:
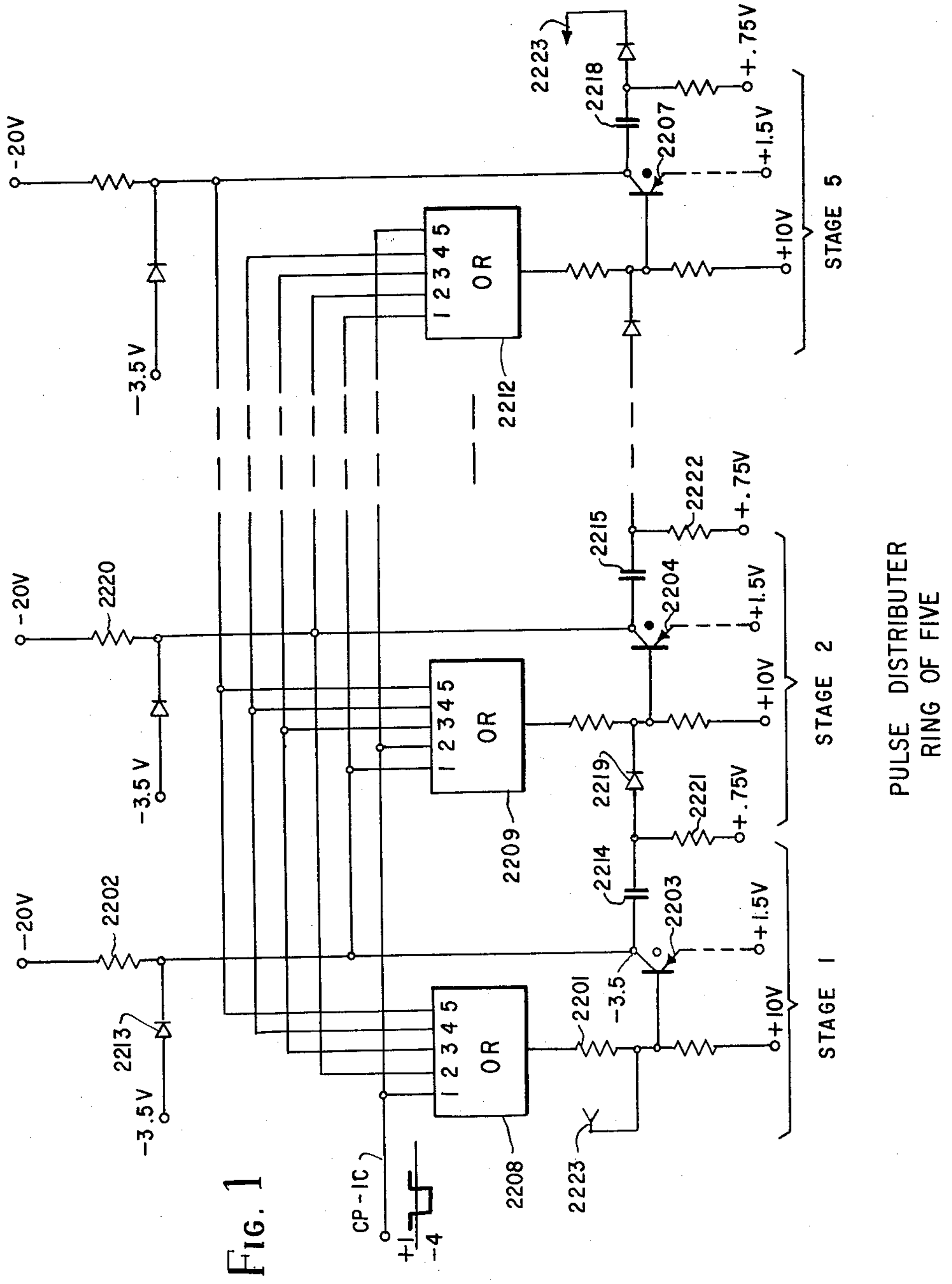
FIG. 1 is a simplified schematic and functional block diagram of the pulse distributor.

To facilitate explanation of the circuit operation, a simplified schematic of the pulse distributor ring-of-five circuit is shown in FIG. 1. As shown therein, each stage is provided with an "OR" circuit having five inputs and an output feeding the base of the corresponding transistor through a resistor such as resistor 2201 which corresponds to resistors 1711 and 1712.

The collector of each transistor is connected to the corresponding input of the "OR" circuits of all other stages and to −20 volts through resistor 2202 which corresponds to resistor 1713. The remaining inputs to the "OR" circuits are connected to the input lead CP–1C.

Assume that transistors 2204 to 2207, which correspond to transistors 1707 to 1710, are conducting, then their collectors are at approximately +1.5 volts since the transistors 2204 to 2207 are saturated. In the absence of an input pulse, all five input of "OR" circuit 2208 are at approximately +1.5 volts and transistor 2203 has its base reverse biased and is therefore cut off.

With transistor 2203 cut off, current flowing through resistor 2202 is fed to input 1 of "OR" circuits 2209 to 2212, which corresponds to points 1714 to 1717, providing the base current required to maintain transistors 2204 through transistor 2207 conducting. The collector of transistor 2203 is clamped at −3.5 volts through diode 2213, corresponding to diode 1718, to prevent collector breakdown, as the surface barrier transistors 2203 to 2207 are limited to low voltage operation. From the symmetry of the circuit it should be obvious that with any one of transistors 2203 to 2207 cut off, the other four will be conducting and these will maintain the cutoff state of the one such transistor.

With the circuit as shown, capacitor 2214, which corresponds to capacitor 1719, is charged to approximately 4 volts. There is a negligible charge on capacitors 2215 to 2218 which correspond to capacitors 1720 to 1723, at this time. When a −4 volt pulse appears on the input lead CP–1C, it feeds current through input 1 of "OR" circuit 2208, which corresponds to point 1724, to turn on transistor 2203 which thereupon saturates. The collector of transistor 2203 swings from −3.5 volts to nearly +1.5 volts driving the base of transistor 2204 negative through capacitor 2214 and diode 2219, which corresponds to diode 1725, and shunts the base feed circuit to input 1 of "OR" circuits 2209 to 2212. Transistor 2204 cuts off due to the discharge of capacitor 2214, but transistors 2205 (not shown) to 2207 are maintained conducting by base current fed to the corresponding inputs of "OR" circuits 2210 (not shown) to 2212 from lead CP–1C, which corresponds to a current from lead CP–1C through points 1727 to 1729.

When transistor 2204 cuts off, a new base feed circuit is established through resistor 2220, which corresponds to resistor 1730, and input 2 of "OR" circuits 2208 and 2210 or 2212. Thus, upon expiration of the input pulse from lead CP–1C, transistor 2204 remains cut off and transistors 2203 and 2205 to 2207 remain conducting. Capacitor 2214 discharges through diode 2219 and the base emitter path of transistor 2204 in multiple with resistor 2221, which corresponds to resistor 1731, until diode 2219 becomes reverse biased, thereafter continuing to discharge solely through resistor 2221.

It should be apparent that the input pulse on lead CP–1C must persist long enough for transistor 2203 to turn on and in turn cut off transistor 2204, and yet expire before the charge on capacitor 2214 is dissipated since it is this charge that overrides the input pulse on lead CP–1C and turns off transistor 2204. If the pulse repetition rate is low, capacitor 2214 may be made large so as to obtain a wide tolerance on the duration of the input pulse. In the present case the pulse repetition rate is very high hence the value of capacitor 2214 must be carefully considered.

The input pulses on lead CP–1C from the clock are 0.5 microsecond in duration with 1.5 microseconds spacing between successive pulses. Thus capacitor 2214 must discharge slowly enough to maintain transistor 2204 cutoff during the 0.5 microsecond pulse and yet quickly enough so as not to prevent transistor 2204 from being turned on by the next subsequent pulse on lead CP–1C. Also during the 1.5 to 2.0 microsecond interval that transistor 2204 is cut off, the coupling capacitor 2215 must charge to nearly 4 volts through resistor 2222, which corresponds to resistor 1732. With properly selected components this ring-of-five counting circuit has been found to operate reliably at 500,000 steps per second with the input pulses on lead CP–1C ranging from 0.25 to 1.0 microsecond in duration.

It can be seen that with each subsequent pulse on lead CP–1C, the ring-of-five counter circuit will advance one step and since the stage associated with transistor 2207 is connected to the stage associated with transistor 2201 by lead 2223, which corresponds to lead 1735, the circuit will advance in a ring sequence.

Returning again to FIG. 4, the slave transistor 1701 of the first stage is normally biased beyond cutoff by +10 volts applied through resistor 1733 to the base of transistor 1701, the base of transistor 1701 being clamped to +1.5 volts through diode 1734. When transistor 1706 is turned on, as has been explained, by an input pulse on lead CP–1C, its emitter current, about 4 milliamperes flows through resistor 1733 to +10 volts and through the base emitter path of transistor 1701 to +1.5 volts. Since approximately 2 milliamperes flows through resistor 1733, there is about 2 milliamperes left for the base input current to transistor 1701.

Since transistor 1701 has a minimum current gain of 30, there is ample drive to bring the collector of transistor 1701 to the saturation region with load currents up to 50 milliamperes. The actual load is much less than this, the excess drive being provided primarily to secure fast response. To avoid hold storage effects in transistor 1701, which would delay turn-off when transistor 1706 received current from the stage associated with transistor 1710, diode 1736, together with the voltage divider from +10 volts composed of resistors 1737 and 1738, is arranged to conduct when transistor 1701 approaches saturation to reduce the base current to a value just sufficient to maintain the collector of transistor 1701 close to, but not in, the saturation region.

The output from this ring-of-five counter circuit is taken out on leads 1739 to 1743. As is readily seen only one of these leads will have a negative potential thereon and that will be the lead that is associated with the stage which has its switching and slave transistor cut off. It also can be seen that the duration of the negative pulse is approximately 2.0 microseconds.

The front edge of the output pulse will lag the front edge of the pulse on lead CP–1C by the amount of time it takes to cut off the switching and slave transistors.

Although the circuit has five stable states as described above, it is not inherently stable when power is first applied unless forced into one of its stable states by some external means. Consequently it would oscillate at high frequency if nothing was done to prevent it. The means to prevent such oscillation is the small capacitor such as 1749 bridged between the emitter and collector of each of the transistors 1706 to 1710. These capacitors reduce the gain at high frequencies to prevent such oscillation, but are small enough so as to have an insignificant effect on the normal counting operation. It has been seen that when at least two of the capacitors 1749 to 1753 are provided, the circuit always sets itself to one of its five stable states the instant that power is applied.

Referring now to FIG. 3 there is a ring-of-two counter circuit associated with transistors 1601 to 1604 identical to the ring of-five circuit previously described except that it is reduced from five stages to two stages. Therefore no detailed explanation of the circuit is deemed necessary.

The circuit is also triggered by pulses on lead CP–1C. The normal potential on output leads 1605 and 1606 is +1.5 volts except when a pulse appears thereon which drops the potential to −7 volts.

Therefore it can be seen that the output pulses on leads 1605 and 1606 will be approximately identical to the output pulses from the ring-of-five counter.

The output pulses from the ring-of-five counter circuit on leads 1739 to 1743 and the output pulses from the ring-of-two counter circuit on leads 1605 and 1606 are fed into a diode matrix circuit associated with diodes 1607 to 1626 to expand the outputs of these two last-mentioned counter circuits to ten circuits.

The outputs of the ring-of-two counter circuit on leads 1605 and 1606 swing alternately from near +1.5 volts to approximately −7 volts. Similarly the five outputs from the ring-of-five counter circuit on leads 1739 to 1743 swing sequentially from near +1.5 volts to −7 volts and back to +1.5 volts.

As can be seen from the diode matrix circuit approximately +1.5 volts will appear on leads DP–1 to DP–0 whenever either or both diodes associated with one of the leads DP–1 to DP–0 has +1.5 volts placed thereon.

Therefore, when a negative −7 volts appears on both diodes associated with any particular lead, both these diodes will be blocked and a −7 volts will appear on that lead.

Thus lead DP–1 is at −7 volts during the 2 microsecond interval that both leads 1739 and 1605 have −7 volts placed thereon. The succeeding clock pulse on lead CP–1C causes the −7 volt condition to advance from lead 1739 to 1740 and from lead 1605 to 1606 therefore causing a −7 volts pulse to appear on lead DP–2. In like manner the −7 volts condition is advanced sequentially every two microseconds over leads DP–3 through lead DP–0.

What is claimed is:

1. In a pulse distributor, a ring counter comprising a plurality of counter stages connected in a closed loop with a common input circuit and individual output circuits, each stage comprising a single transistor having base, emitter and collector electrodes, and having a current gain factor, alpha, less than unity; the transistor of each stage having a conductive and a non-conductive condition, only one at a time of the stages being in the non-conductive condition; and means including said stages operated responsive to receipt of successive pulses over said input circuit for causing said stages to be successively operated to the non-conductive condition, each transmitting an output pulse over its output circuit during its non-conductive condition.

2. In a pulse distributor the combination as claimed in claim 1, further including a second ring counter, a plurality of gate circuits having individual output leads connected thereto, the number of said output leads being equal to the product of the number of output circuits in the first and second counting devices, and circuit means for selectively combining the output pulses from said first and second ring counters at said gate circuits, the coincidence of a first and a second pulse in a particular gate circuit being effective to produce a pulse in the output lead connected to said particular gate circuit.

3. In a pulse distributor the combination as claimed in claim 1, wherein said transistors are of the surface barrier type.

4. In a pulse distributor the combination as claimed in claim 1, further including a transistor amplifier in said output circuit of each stage.

5. In a pulse distributor the combination as claimed in claim 1, wherein said means for causing successive stages to be operated to the non-conductive condition comprises a capacitor and resistor for each of said stages, the capacitor being coupled in circuit between the collector electrode of each transistor and the base electrode of the transistor of the succeeding stage, and the resistor being coupled from the base electrode of each transistor to a source of direct current potential, each of said input pulses being effective to remove the cutoff bias from the non-conducting stage and simultaneously discharge the capacitor corresponding to said non-conducting stage, the discharge path for said capacitor including the resistor corresponding to the next succeeding stage, whereby said next succeeding stage is biased to cutoff.

6. In a pulse distributor, the combination as claimed in claim 5, wherein said means for causing said stages to be successively operated to the non-conductive condition further comprises individual OR gate circuits associated with said stages; each OR gate circuit having an output and a plurality of inputs, with a connection from its output to the base electrode of the transistor of the associated stage, a connection to one of its inputs from said common input circuit, and respective connections to its other inputs from the collector electrodes of the transistors of the other stages; means biasing the transistor of each stage so that in the absence of an output signal from its associated OR gate it is non-conductive, and the collector output signal from the one stage which is non-conductive being coupled through the OR gates of each of the other stages to maintain them conductive.

7. In a pulse distributor, the combination as claimed in claim 6, further including an amplifier in said output circuit of each stage; each amplifier comprising a transistor having base, emitter and collector electrodes, with its base electrode connected to the emitter electrode of the transistor of the associated counter stage, and its collector electrode connected to an output conductor, and means including a diode connected in a circuit between the base and collector electrodes for preventing the amplifier transistor from reaching the saturation region during conduction.

8. In a pulse distributor the combination as claimed in claim 5, wherein in at least two of said stages a capacitor is connected between the emitter and collector electrodes of the transistor to prevent high frequency oscillation.

References Cited in the file of this patent

UNITED STATES PATENTS

| | | |
|---|---|---|
| 2,534,232 | Cleeton | Dec. 19, 1950 |
| 2,665,845 | Trent | Jan. 12, 1954 |
| 2,734,684 | Ross et al. | Feb. 14, 1956 |
| 2,812,390 | Van Overbeek | Nov. 5, 1957 |
| 2,851,220 | Kimes | Sept. 9, 1958 |
| 2,876,365 | Slusser | Mar. 3, 1959 |
| 2,951,951 | Morgan | Sept. 6, 1960 |
| 2,954,485 | Blair | Sept. 27, 1960 |